(12) United States Patent
Shimojoh

(10) Patent No.: US 8,132,940 B2
(45) Date of Patent: Mar. 13, 2012

(54) LAMP UNIT, ILLUMINATION DEVICE, AND DISPLAY APPARATUS

(75) Inventor: Kazuya Shimojoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 346 days.

(21) Appl. No.: 12/520,973

(22) PCT Filed: Nov. 5, 2007

(86) PCT No.: PCT/JP2007/071496
§ 371 (c)(1),
(2), (4) Date: Jun. 23, 2009

(87) PCT Pub. No.: WO2008/090658
PCT Pub. Date: Jul. 31, 2008

(65) Prior Publication Data
US 2010/0103697 A1   Apr. 29, 2010

(30) Foreign Application Priority Data

Jan. 23, 2007 (JP) .................................. 2007-013126

(51) Int. Cl.
*F21V 7/07* (2006.01)

(52) U.S. Cl. ............. 362/296.05; 362/97.4; 362/296.01; 362/296.04; 362/347; 362/609; 349/58; 349/113

(58) Field of Classification Search ........ 362/97.1–97.2, 362/97.4, 296.01, 296.05, 341, 347, 606, 362/609, 296.04; 349/58, 113
See application file for complete search history.

(56) References Cited

U.S. PATENT DOCUMENTS

| | | | |
|---|---|---|---|
| 2002/0089618 A1 | 7/2002 | Ahn | |
| 2003/0174490 A1 | 9/2003 | Allinson | |
| 2004/0001345 A1* | 1/2004 | Lee et al. | 362/561 |
| 2004/0190280 A1* | 9/2004 | Matsushita | 362/31 |
| 2006/0109689 A1* | 5/2006 | Tanaka | 362/632 |

(Continued)

FOREIGN PATENT DOCUMENTS

CN       2235995 Y       9/1996

(Continued)

OTHER PUBLICATIONS

Full English machine translation for JP-9-304627-A, published Nov. 28, 1997.

(Continued)

*Primary Examiner* — Stephen F Husar
*Assistant Examiner* — Meghan Dunwiddie
(74) *Attorney, Agent, or Firm* — Birch, Stewart, Kolasch & Birch, LLP

(57) ABSTRACT

In a lamp unit (1), a conductive section (2) is formed by directly extending a layer structure of a reflective member (42) from (i) one end of a square U-shape of a part of the reflective member (42) that is closest to a power feeding section for feeding power to the lamp unit (1) toward (ii) a light emission side of the lamp unit (1) and further folding back the extended portion 180 degrees in a direction opposite to the direction that it extends from the reflective member (42). The conductive section (2) is provided with a screw hole (2a) through which the reflective member is connected to another object. This achieves a lamp unit in which, even if a reflective member is fixed to another object with a screw for conduction with an external conductor, a reflective layer is less likely to peel off.

12 Claims, 5 Drawing Sheets

U.S. PATENT DOCUMENTS

2008/0192168 A1* 8/2008 Sudo .............................. 349/58
2009/0033234 A1* 2/2009 Iwamoto ....................... 315/189

FOREIGN PATENT DOCUMENTS

| CN | 1556433 A | 12/2004 |
| JP | 9-304627 A | 11/1997 |
| JP | 10-162618 A | 6/1998 |
| JP | 2000-105372 A | 4/2000 |
| JP | 2001-126522 A | 5/2001 |
| JP | 2005-243485 A | 9/2005 |
| RU | 2 271 557 C2 | 3/2006 |

OTHER PUBLICATIONS

Full English machine translation for JP-2000-105372-A, published Apr. 11, 2000.
Full English machine translation for JP-2005-243485-A, published Sep. 8, 2005.
Full English machine translation for JP-10-162618-A, published Jun. 19, 1998.
Full English machine translation for JP-2001-126522-A, published May 11, 2001.

* cited by examiner under the letter L-shaped cross-section surface. Further, a square U-shaped portion of the reflective member 42 is held by an inner surface of the letter L-shaped cross-section surface. Also, the wiring 45 is held between the reflective member 42 and the resin holder 44.

LAMP UNIT, ILLUMINATION DEVICE, AND DISPLAY APPARATUS

TECHNICAL FIELD

The present invention relates to a lamp unit to be used as a light source unit of a device, an illumination device including the lamp unit, and a display apparatus including the lamp unit.

BACKGROUND ART

FIG. 3 shows a perspective view of a conventional, transmissive liquid crystal display apparatus 100 as seen from behind. Note that FIG. 3 does not show an outer housing of the liquid crystal display apparatus 100. In this figure, a lamp unit 24 to be used as a backlight is inserted (mounted) in an inner space extending along one side end 100a of the liquid crystal display apparatus 100. FIG. 5 shows a schematic cross-sectional view (taken along the line A-A) of the liquid crystal display apparatus 100, with the liquid crystal display apparatus 100 cut along a plane perpendicular to the side end 100a.

This cross-sectional view structure includes (i) a backlight unit 20 serving as an illumination device and (ii) a liquid crystal panel 25. The backlight unit 20 is provided in a back surface side of the liquid crystal display apparatus 100, while the liquid crystal panel 25 is provided in a front surface side of the liquid crystal display apparatus 100. The backlight unit 20 includes the lamp unit 24, a light guide plate 21, a reflective plate 22, and a prism sheet 23. The lamp unit 24 includes two cold cathode fluorescent lamps 41 as a light source. FIG. 5 shows the cold cathode fluorescent lamps 41, with the cold cathode fluorescent lamps 41 cut in a direction perpendicular to their tube axes. The number of such cold cathode fluorescent lamps may be any number other than two. Note that the cross-sectional view does not show a resin case, a back cover, or the like of the liquid crystal display apparatus 100.

In addition to the cold cathode fluorescent lamps 41, the lamp unit 24 includes (i) holding assemblies (not illustrated in FIG. 5) for holding both ends of each of the cold cathode fluorescent lamps 41 and (ii) a reflective member 42 provided around the cold cathode fluorescent lamps 41. The reflective member 42 reflects light emitted by the cold cathode fluorescent lamps 41, so as to guide the light toward the light guide plate 21. The emitted light enters the light guide plate 21 through a lateral side, travels forward within the light guide plate 21 with repetitive reflections, then exits the light guide plate 21 toward the prism sheet 23. The light leaking from a side of the light guide plate 21 opposite to the prism sheet 23 is reflected by the reflective plate 22 toward the prism sheet 23. The light having entered the prism sheet 23 is reflected and refracted within the prism sheet 23 to be directed toward the liquid crystal panel 25. In this manner, the light having exited the prism sheet 23 enters the liquid crystal panel 25 as illumination light.

As shown in a dotted circle of FIG. 3, the lamp unit 24 is arranged so as to be able to be inserted into and removed from the liquid crystal display apparatus 100 through an insertion opening 100b along an arrow. The arrow is parallel to the tube axis of each of the cold cathode fluorescent lamps 41. FIG. 4 shows an enlarged view of the part encircled by the dotted circle. As shown in FIG. 4, the lamp unit 24 includes, on its end that is located in the insertion opening 100b when the lamp unit 24 is inserted, a planar conductive section 43 provided by directly extending a layer structure of the reflective member 42. The conductive section 43 is parallel to a back surface of the liquid crystal display apparatus 100 when the lamp unit 24 is inserted. The conductive section 43 includes a screw hole 43a passing through the conductive section 43 perpendicularly to a layer surface of the conductive section 43. Further, the liquid crystal display apparatus 100 includes, on its back surface, a back cover 51 made of a sheet metal. The back cover 51 includes a fastening section 52, provided in the vicinity of the insertion opening 100b and shaped into a plane parallel to the back surface of the liquid crystal display apparatus 100, which extends from the back cover 51. The fastening section 52 includes a screw hole 52a passing through the fastening section 52 perpendicularly to a surface of the fastening section 52. When the lamp unit 24 is inserted, the conductive section 43 and the fastening section 52 are overlapped with each other such that the fastening section 52 faces the back surface side of the liquid crystal display apparatus 100. In this manner, the screw hole 43a and the screw hole 52a are aligned with each other. Therefore, the conductive section 43 and the fastening section 52 are coupled to each other by inserting a screw 101 into the screw holes 43a and 52a (see FIG. 3). The screw 101 causes a conductor part of the lamp unit 24 to be grounded to the back cover 51 through the conductive section 43 and the fastening section 52, thereby preventing a noise breakout and electrostatic accumulation in the lamp unit 24.

Next, FIG. 6 shows a perspective view of an overall structure of the lamp unit 24. Schematically, the lamp unit 24 is a unit structured such that each member is supported by a resin holder 44 extending along the tube axis of each of the cold cathode fluorescent lamps 41. As described in FIG. 5, both ends of each of the cold cathode fluorescent lamps 41 are held by the holding assemblies 40. The holding assemblies 40 are made, for example, of rubber. The lamp unit may also be structured such that the cold cathode fluorescent lamps are held by ends of lead wires without use of the resin holder. The resin holder 44 holds the reflective member 42 of the lamp unit 24 on its inner surface. Also, the resin holder 44 covers an outer side of the lamp unit 24 along the tube axis of the lamp unit 24, and includes the holding assemblies 40 on its inner side. As shown in FIG. 5, the reflective member 42 has a square U-shaped cross-section surface when cut along a plane perpendicular to the tube axis, and includes an open side 42a on a light emission side (i.e., the side indicated by an arrow in FIG. 6) of the lamp unit 24. It should be noted that the cross-section surface may have a letter U shape, a shape forming a part of a polygon, or the like. The resin holder 44 further includes wiring 45 through which the lamp unit 24 is connected to a power feeding section for feeding power to the cold cathode fluorescent lamps 41. The wiring 45 includes, on its ends, two connectors 45a to be connected to the power feeding section, which is not illustrated. The conductive section 43 is formed by directly extending the layer structure of the reflective member 42 from (i) one end of a square U-shape of a part of the reflective member 42 that is closest to the power feeding section for feeding power to the lamp unit 24 toward (ii) the light emission side of the lamp unit 24.

FIG. 7 shows a cross-sectional view of the conductive section 43 taken along the line B-B. The line B-B is perpendicular to the tube axis of each of the cold cathode fluorescent lamps 41, and passes through the screw hole 43a.

The resin holder 44 has a letter L-shaped cross-section surface, and a square U-shaped portion of the reflective member 42 is held on an inner surface of the letter L-shaped portion. A plane including the two tube axes of the cold cathode fluorescent lamps 41 is supposed to be parallel to a planar surface 44a whose cross-section surface corresponds to one side of the letter L-shaped cross-section surface. The open side 42a, which is an opening of the square U-shaped portion, opens toward a direction perpendicular to the planar surface 44a and opposite to the planar surface 44a. The resin holder is not limited to the above shape, and may be provided in any shape, such as a shape of a plate whose cross-section surface corresponds to one side of the letter L-shaped cross-section surface.

The reflective member 42 includes a stack of a sheet metal 421 and a reflective layer 422. The sheet metal 421 constitutes an outer layer of the reflective member 42, and is formed with use of stainless steel, aluminum, brass, or the like. The reflective layer 422 constitutes an inner layer of the reflective member 42, and is formed with use of silver, white PET (polyethylene terephthalate), or the like. The sheet metal 421 serves as a holding member for holding the reflective layer 422. At least a part of light emitted by the cold cathode fluorescent lamps 41 is reflected by the reflective layer 422 of the reflective member 42, and then emitted from the lamp unit 24 through the open side 42a. Since the conductive section 43 is formed by directly extending the layer structure of the reflective member 42, the conductive section 43 includes the stack of the sheet metal 421 and the reflective layer 422 in the same manner as the reflective member 42. The fastening section 52, the conductive section 43, and a resin case 102 are fastened to one another by inserting the conductive section 43 between the fastening section 52 and the resin case 102, aligning the screw hole 52a of the fastening section 52, the screw hole 43a of the conductive section 43, and a screw hole 102a of the resin case 102 with one another, and then inserting the screw 101 into the aligned holes from the side of the fastening section 52. In this manner, the fastening section 52 makes contact with the sheet metal 421, and the resin case 102 makes contact with the reflective layer 422 of the conductive section 43. Further, conductor parts that make contact with the screw 101 are conductive with each other.

FIG. 8 shows the layer structure of the reflective member 42 and the conductive section 43 in more detail.

The sheet metal 421 and the reflective layer 422 are bonded to each other with an adhesive 423. On top of the reflective layer 422, an inorganic layer 424 and an inorganic layer 425 are stacked in this order; however, these inorganic layers do not necessarily exist.

Further, each of Patent Literatures 1 to 3 discloses a conventional structure in which a conductive part of a lamp unit is coupled to a metal frame of a device with a screw.

CITATION LIST

Patent Literature 1

Japanese Patent Application Publication, Tokukai, No. 2000-105372 A (Publication Date: Apr. 11, 2000)

Patent Literature 2

Japanese Patent Application Publication, Tokukai, No. 2001-126522 A (Publication Date: May 11, 2001)

Patent Literature 3

Japanese Patent Application Publication, Tokukai, No. 2005-243485 A (Publication Date: Sep. 8, 2005)

SUMMARY OF INVENTION

In the above conventional lamp unit 24, a heat cycle of heating and cooling of the cold cathode fluorescent lamps 41 is caused by repeatedly turning on and off the cold cathode fluorescent lamps 41. This causes the reflective layer 422, which is included in the reflective member 42 of the lamp unit 24, to repeatedly expand and contract in directions perpendicular to a surface of the reflective layer 422. As shown above in FIG. 8, the adhesive 423 is used between the sheet metal 421 and the reflective layer 422 to bond them to each other. The adhesive 423 softens when the cold cathode fluorescent lamps 41 generate heat. In addition, due to a difference in coefficient of thermal expansion between the sheet metal 421 and the reflective layer 422, the reflective layer 421 becomes likely to peel off from the sheet metal 422.

Under this circumstance, if the conductive section 43 is fixed to the resin case 102 with the screw 101 as in the lamp unit 24 and the reflective layer 422 therefore makes contact with the resin case 102, the reflective layer 422 is subjected to forces of expansion and contraction of the resin case 102 as the resin case 102 expands or contracts due to the heat cycle. This undesirably causes the reflective layer 422 to peel off from the sheet metal 421.

The present invention has been made in view of the foregoing problems, and it is an object of the present invention to achieve (i) a lamp unit in which even if a reflective member is fixed to another object with a screw for conduction with an external conductor, a reflective layer is less likely to peel off, (ii) an illumination device including the lamp unit, and (iii) a display apparatus including the lamp unit.

In order to attain the object, a lamp unit of the present invention, the lamp unit including (i) a lamp for emitting light and (ii) a reflective member, provided around the lamp, which has a stack of a sheet metal and a reflective layer that reflects at least a part of the light outward, includes: a folded section formed by folding back the reflective member 180 degrees such that the reflective layer is positioned inside the sheet metal, the folded section being provided with a screw hole through which the reflective member is connected to another object other than the lamp unit in the folded section.

In this invention, the folded section is connected to the another object with a screw through the screw hole. This makes it possible to fix the reflective member to the another object other than the lamp unit while keeping the reflective member conductive with an external conductor through the folded section. The folded section is formed by folding back the reflective member 180 degrees such that the reflective layer is positioned inside the sheet metal. Since the reflective layer is positioned inside the sheet metal, the sheet metal makes contact with the another object when the folded section is connected to the another object. Thus, the reflective layer in the folded section does not make contact with the another object. Therefore the reflective layer does not peel off from the sheet metal due to forces of expansion and contraction of the another object.

This makes it possible to achieve a lamp unit in which even if a reflective member is fixed to another object with a screw for conduction with an external conductor, a reflective layer is less likely to peel off.

In order to attain the object, the lamp unit of the present invention is configured such that the another object is a part of a display apparatus.

This invention makes it possible to fix the lamp unit to the display apparatus by connecting the lamp unit to the another object with the screw.

In order to attain the object, the lamp unit of the present invention is configured such that the folded section is fixed with a screw through the screw hole so as to be sandwiched between the part of the display apparatus and another part of the display apparatus.

This invention makes it possible to firmly fix the lamp unit to the display apparatus.

In order to attain the object, the lamp unit of the present invention is configured such that the another part of the display apparatus is connected to a ground conductor of the display apparatus.

This invention makes it possible to prevent electrostatic accumulation in the lamp unit, because the sheet metal and the reflective layer of the lamp unit are connected to the ground conductor, such as a back cover of the display apparatus, through the screw and the another object of the display apparatus.

In order to attain the object, the lamp unit of the present invention is configured such that the reflective layer is made of a conductor.

In this invention, the reflective layer is a conductor. Therefore, if the reflective layer peels off as has been the case conventionally, a piece of the reflective layer may make contact with or short-circuit another circuit portion such as a substrate of an apparatus in which the lamp unit has been mounted. However, the reflective layer of the present invention is less likely to peel off. This makes it possible to prevent the reflective layer from making such a contact or causing such a short circuit.

In order to attain the object, the lamp unit of the present invention is configured such that the reflective layer is formed with use of silver or with use of white PET.

This invention makes it possible to achieve a lamp unit in which a reflective layer is formed with use of silver or with use of white PET, which has been available conventionally, and yet less likely to peel off.

In order to attain the object, the lamp unit of the present invention is configured such that the sheet metal is formed with use of stainless steel, aluminum, or brass.

This invention makes it possible to achieve a lamp unit in which a sheet metal is formed with use of stainless steel, aluminum, or brass, which has been available conventionally, and yet a reflective layer is less likely to peel off.

In order to attain the object, an illumination device of the present invention includes the lamp unit described above, the lamp unit being used to output illumination light.

This invention makes it possible to achieve an illumination device in which a reflective layer of a lamp unit is less likely to peel off.

In order to attain the object, a display apparatus of the present invention includes the illumination device described above, the illumination device emitting illumination light to be used for a display.

This invention makes it possible to achieve a display apparatus in which a reflective layer of a lamp unit is less likely to peel off.

For a fuller understanding of the other objects, features, and advantages of the invention, reference should be made to the ensuing detailed description taken in conjunction with the accompanying drawings.

REFERENCE NUMERALS

1 Lamp Unit
2 Conductive Section (Folded Section)
2a Screw Hole
42 Reflective Member
421 Sheet Metal
422 Reflective Layer
102 Resin Case (Another Object)
20 Backlight Unit (Illumination Device)
100 Liquid Crystal Display Apparatus (Display Apparatus)

DESCRIPTION OF EMBODIMENTS

One embodiment of the present invention is described below with reference to FIGS. 1 to 5 and FIG. 8.

Figure 2:
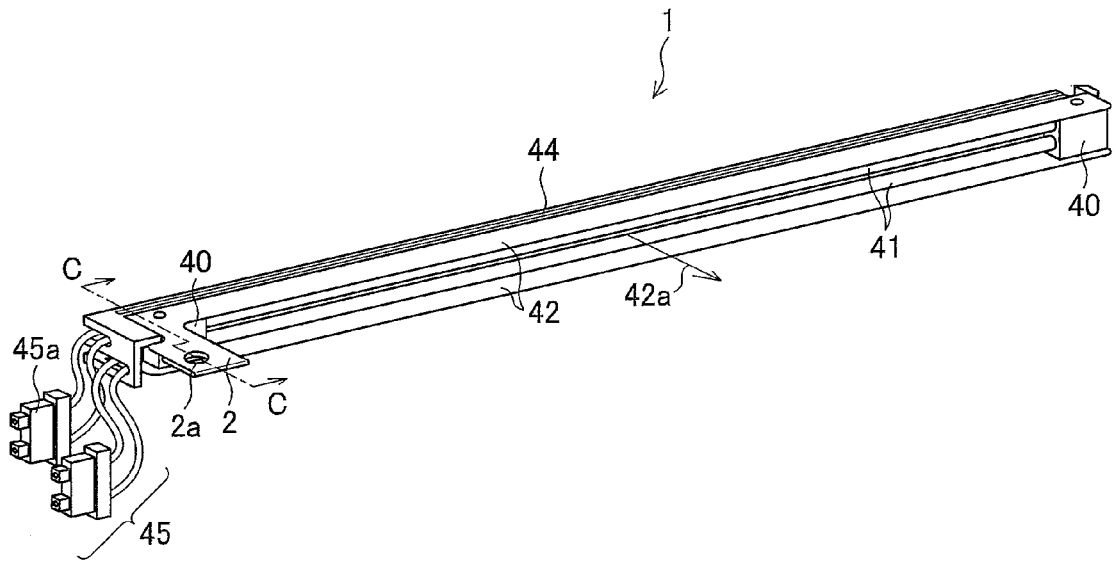
FIG. 2 is a perspective view illustrating an overall structure of the lamp unit of FIG. 1.
Figure 3:
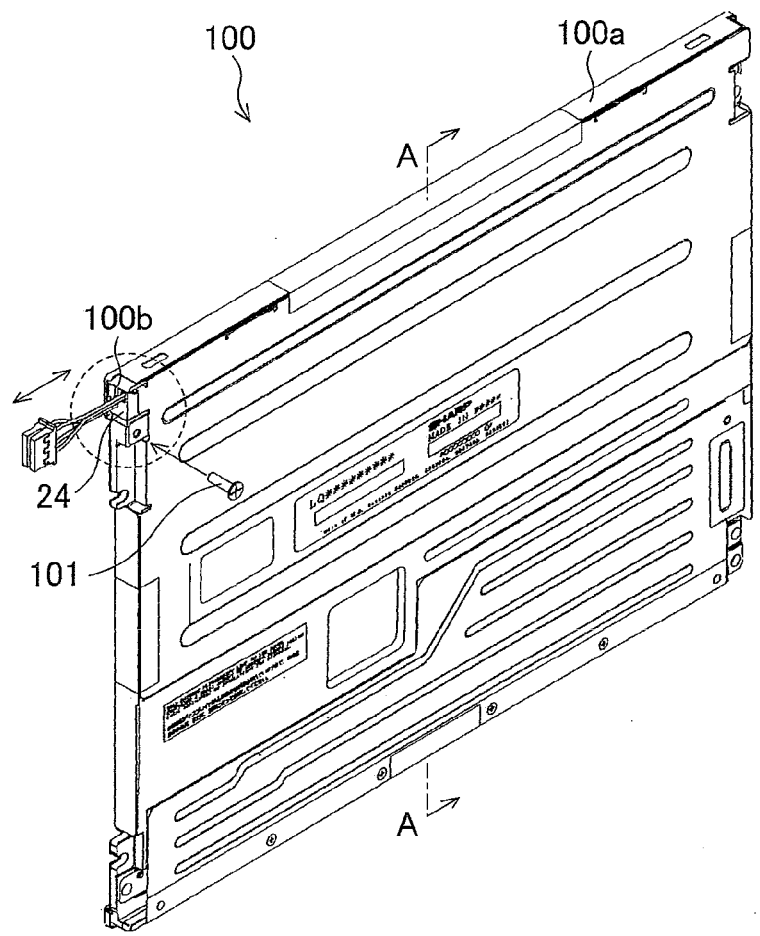
FIG. 3 is a perspective view illustrating a structure of a liquid crystal display apparatus into and from which a lamp unit is inserted and removed.
Figure 4:
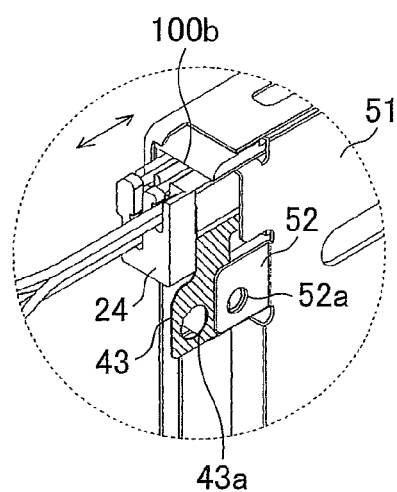
FIG. 4 is a perspective view illustrating how a lamp unit is inserted and removed into and from the liquid crystal display apparatus.

FIG. 2 shows a perspective view of a lamp unit 1 according to the present embodiment. As is the case with the lamp unit 24 illustrated in FIG. 6, the lamp unit 1 includes two cold cathode fluorescent lamps 41. The number of such cold cathode fluorescent lamps may be any number other than two. Schematically, the lamp unit 1 is a unit structured such that each member is supported by a resin holder 44 extending along the tube axis of each of the cold cathode fluorescent lamps 41. Both ends of each of the cold cathode fluorescent lamps 41 are held by two holding assemblies 40. The lamp unit may also be structured such that the cold cathode fluorescent lamps are held by ends of lead wires without use of the resin holder. The holding assembly 40 is made, for example, of rubber. The resin holder 44 holds a reflective member 42 of the lamp unit 1 on its inner surface. Also, the resin holder 44 covers an outer side of the lamp unit 1 along the tube axis of the lamp unit 1, and includes the holding assembly 40 on its inner side. As illustrated above in FIG. 5, the reflective member 42 has a square U-shaped cross-section surface when cut along a plane perpendicular to the tube axis, and includes an open side 42a on a light emission side (i.e., the side indicated by an arrow in FIG. 2) of the lamp unit 1. It should be noted that the cross-section surface may have a letter U shape, a shape forming a part of polygon, or the like. The resin holder 44 further includes wiring 45 through which the lamp unit 1 is connected to a power feeding section for feeding power to the two cold cathode fluorescent lamps 41. The wiring 45 includes, on its ends, two connectors 45a to be connected to the power feeding section, which is not illustrated. A conductive section (folded section) 2 is formed by: directly extending a layer structure of the reflective member 42 from (i) one end of a square U-shape of a part of the reflective member 42 that is closest to the power feeding section for feeding power to the lamp unit 1 toward (ii) the light emission side of the lamp unit 1; and then folding back the extended portion in a way described later. The conductive section 2 includes a screw hole 2a through which the reflective member 42 is connected to another object.

As is the case with the lamp unit 24 illustrated above in FIGS. 3 and 4, the lamp unit 1 thus structured can be inserted and removed into and from a liquid crystal display apparatus 100. As is the case with the lamp unit 24 illustrated above in FIG. 5, the lamp unit 1 is used as a light source unit of the backlight unit 20 when inserted into the liquid crystal display apparatus 100.

Figure 1:
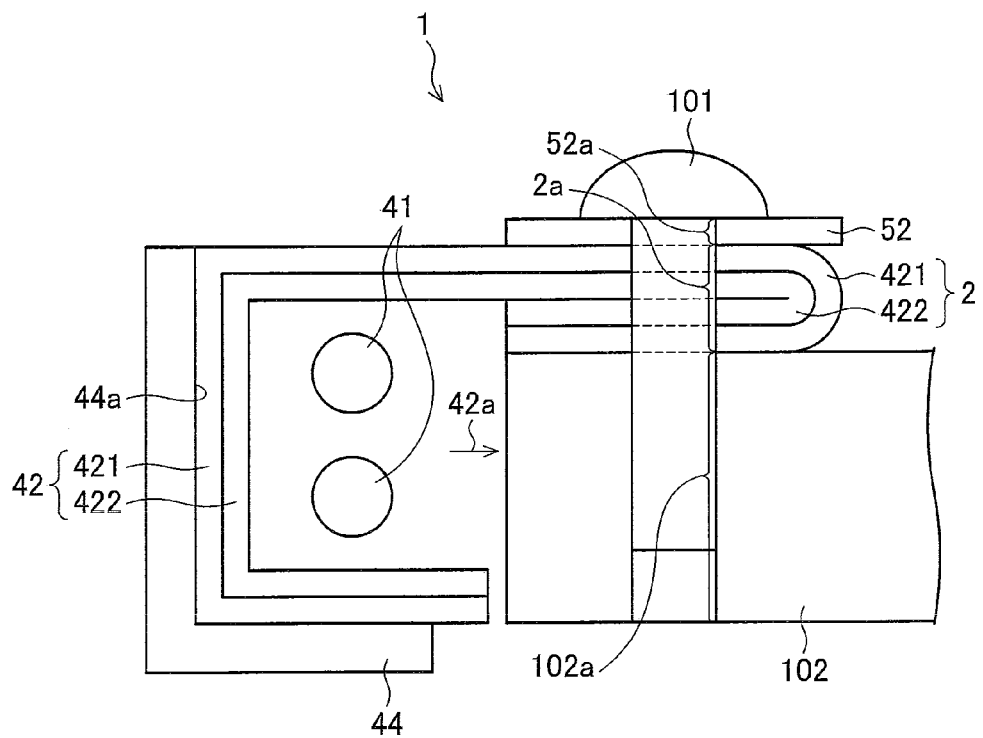
FIG. 1, showing an embodiment of the present invention, is a cross-sectional view illustrating structures of a conductive section of a lamp unit and area surrounding the conductive section.

FIG. 1 shows a cross-sectional view of the conductive section 2 of FIG. 2 taken along the line C-C. The line C-C extends along the direction that the conductive section 2 extends from the reflective member 42.

The resin holder 44 has a letter L-shaped cross-section surface when it is cut as described above, and a square U-shaped portion of the reflective member 42 is held on an inner surface of the letter L-shaped portion. A plane including the two tube axes of the cold cathode fluorescent lamps 41 is supposed to be parallel to a planar surface 44a whose cross-section surface corresponds to one side of the letter L-shaped cross-section surface. The open side 42a, which is an opening of the square U-shaped portion, opens toward a direction perpendicular to the planar surface 44a and opposite to the planar surface 44a. The resin holder is not limited to the above shape, and may be provided in any shape, such as a shape of a plate whose cross-section surface corresponds to one side of the letter L-shaped cross-section surface.

The reflective member 42 includes a stack of a sheet metal 421 and a reflective layer 422. The sheet metal 421 constitutes an outer layer of the reflective member 42, and is formed with use of stainless steel, aluminum, brass, or the like. The reflective layer 422 constitutes an inner layer of the reflective member 42, and is formed with use of silver, white PET (polyethylene terephthalate), or the like. Since the conductive section 2 is formed by directly extending the layer structure of the reflective member 42, the conductive section 2 includes the stack of the sheet metal 421 and the reflective layer 422 in the same manner as the reflective member 42. The reflective member 42 and the conductive section 2 are both identical in detailed layer structure to the reflective member 42 and the conductive section 43 illustrated above in FIG. 8. Further, in FIG. 1, the conductive section 2 extends from an end of the square U-shaped portion of the reflective member 42 that is positioned on a back surface side of the liquid crystal display apparatus 100, i.e., on a side opposite to a liquid crystal panel 25. This makes it possible to fix the conductive section 2 with a screw 101 from the back surface side of the liquid crystal display apparatus, thereby achieving easy handling.

It should be noted here that the conductive section 2 is folded back 180 degrees in a direction opposite to the direction that it extends from the reflective member 42, such that the reflective layer 422 is positioned inside the sheet metal 421. The conductive section 2 can be folded back, for example, by performing Hemming bend. Hemming is a bending process by which: a workpiece is bent 90 degrees; the bent workpiece is further bent to 135 degrees; and then the bending is closed with flattening forces from both sides at 90 degrees. The folded-back conductive section 2 has a screw hole 2a passing through the conductive section 2 perpendicularly to a layer surface of the conductive section 2.

Figure 9:
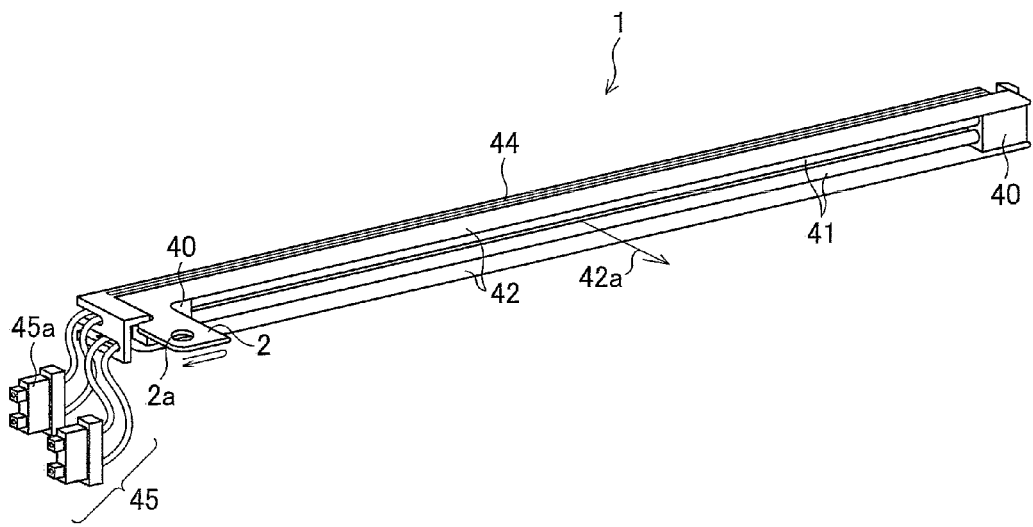
FIG. 9 is a perspective view illustrating a structure of a first modification of the lamp unit of the embodiment of the present invention.
Figure 10:
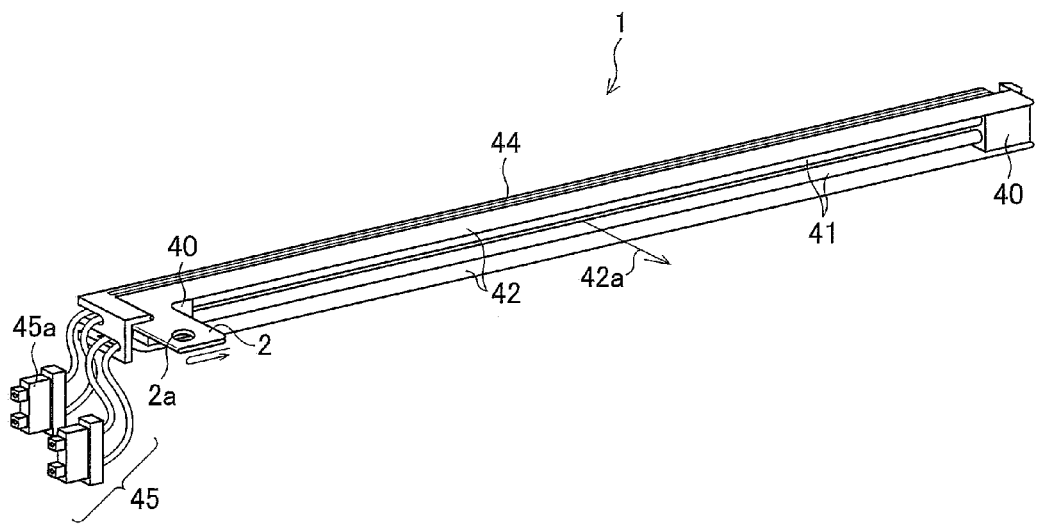
FIG. 10 is a perspective view illustrating a structure of a second modification of the lamp unit of the embodiment of the present invention.

The conductive section 2 may also be folded back in a direction perpendicular to the direction that it extends from the reflective member 42, i.e., in a direction parallel to the tube axis of the lamp unit 1. FIGS. 9 and 10 show structures of such modifications of the lamp unit 1. FIG. 9 shows the structure of the lamp unit 1, in which the conductive section 2 is folded back in a direction parallel to the tube axis as indicated by an arrow. In this structure, the conductive section 2 is folded back at an end closer to a central part of the lamp unit 1. FIG. 10 shows the structure of the lamp unit 1, in which the conductive section 2 is folded back in a direction parallel to the tube axis as indicated by an arrow. In this structure, the conductive section 2 is folded back at an end closer to the power feeding section for feeding power to the lamp unit 1. Both in FIGS. 9 and 10, the conductive section 2 is folded back such that the reflective layer 422 is positioned inside the sheet metal 421 as in FIG. 1.

Figure 7:
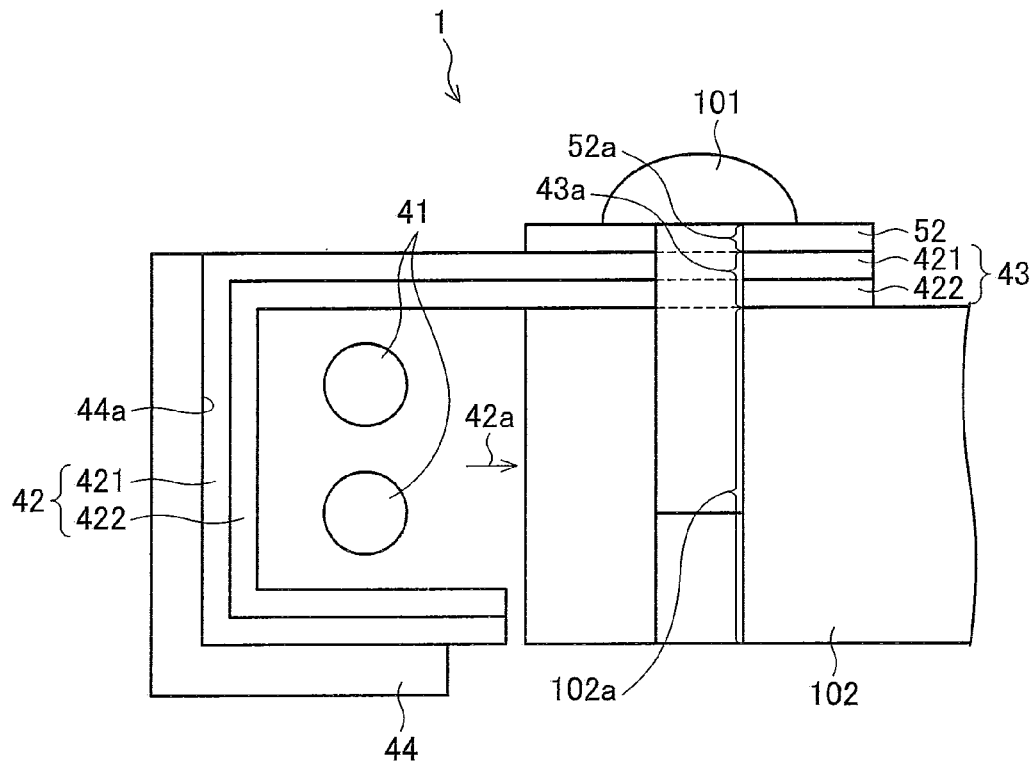
FIG. 7 is a cross-sectional view illustrating structures of a conductive section of the lamp unit of FIG. 6 and an area surrounding the conductive section.
Figure 8:
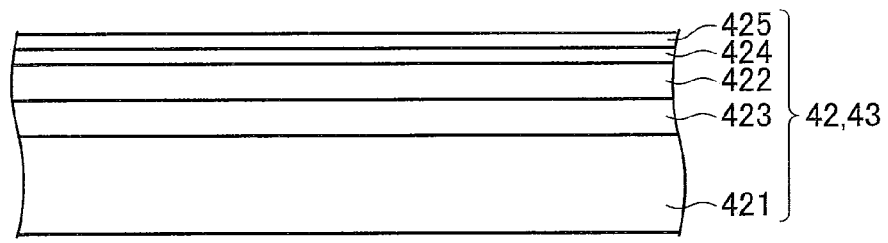
FIG. 8 is a cross-sectional view illustrating a layer structure of a reflective member and a conductive section.

The fastening section 52 illustrated above in FIG. 7, the conductive section 2, and a resin case 102 of the liquid crystal display 100 are fastened to one another by inserting the conductive section 2 between the fastening section 52 and the resin case 102, aligning the screw hole 52a of the fastening section 52, the screw hole 2a of the conductive section 2, and a screw hole 102a of the resin case 102 with one another, and then inserting the screw 101 into the aligned holes from the side of the fastening section 52. In this manner, both the fastening section 52 and the resin case 102 make contact with the sheet metal 421 of the conductive section 43, and the resin case 102 does not make contact with the reflective layer 422 of the conductive section 2. Further, conductor parts that make contact with the screw 101, i.e., the sheet metal 421 of the conductive section 2, the reflective layer 422 (made of a conductor) of the conductive section 2, and the fastening section 52, are conductive with one another. Conductor parts of the lamp unit 1 (i.e., the sheet metal 421 of the reflective member 42 and the reflective layer 422 (made of a conductor) of the reflective member 42) are grounded to a back cover 51 through the conductive section 2 and the fastening section 52, thereby preventing a noise breakout and electrostatic accumulation in the lamp unit 1.

In the present embodiment, the provision of the conductive section 2, which is formed by folding back the reflective member 42 180 degrees such that the reflective layer 422 is positioned inside the sheet metal 421, allows the sheet metal 421 to make contact with the resin case 102 while preventing the reflective layer 422 from making contact with the resin case 102. Therefore, even if heat generated by the cold cathode fluorescent lamps 41 causes an adhesive 423 to become so soft that the reflective layer 422 becomes more likely to peel off from the sheet metal 421, the reflective layer 422 does not peel off from the sheet metal 421 due to forces of expansion and contraction of the resin case 102. It is possible that the likelihood that the reflective layer 422 will peel off is made lower by inserting, between the reflective layer 422 and the resin case 102 in the conventional structure, a cushion that is less likely to transmit the forces of expansion and contraction of the resin case 102. However, the present embodiment does not even require such a buffer material, because the present embodiment is such that the reflective layer 422 does not make contact with the resin case 102. Consequently, the present embodiment realizes a simplification in structure and a reduction in cost.

Further, even in cases where the reflective layer 422 is formed directly on top of the sheet metal 421 by sputtering, evaporation, or the like, the reflective layer 422 is not subjected to the forces of expansion and contraction of the resin case 102, because the conductive section 2 is provided as a folded section. Therefore, the reflective layer 422 can be prevented from coming off due to rubbing.

As a result, it is possible to achieve (i) a lamp unit in which, even if a reflective member is fixed to another object with a screw for conduction with an external conductor, a reflective layer is less likely to peel off, (ii) an illumination device including the lamp unit, and (iii) a display apparatus including the lamp unit.

Note that it is possible to use, as a light source of the lamp unit 1, a hot cathode fluorescent lamp, a light-emitting diode, or the like, as well as a cold cathode fluorescent lamp.

Further, in cases where the reflective layer 422 is a conductor such as silver and if the reflective layer 422 peels off as has often been the case conventionally, such a problem arises that a piece of the reflective layer 142 may make contact with or short-circuit another circuit portion such as a substrate of an apparatus in which the lamp unit has been mounted, in addition to the problem of such a disarray in structure that the reflective layer 422 peels off. However, in the lamp unit 1, the reflective layer 422 is less likely to peel off. This makes it possible to prevent the reflective layer 422 from making such a contact or causing such a short circuit.

Figure 5:
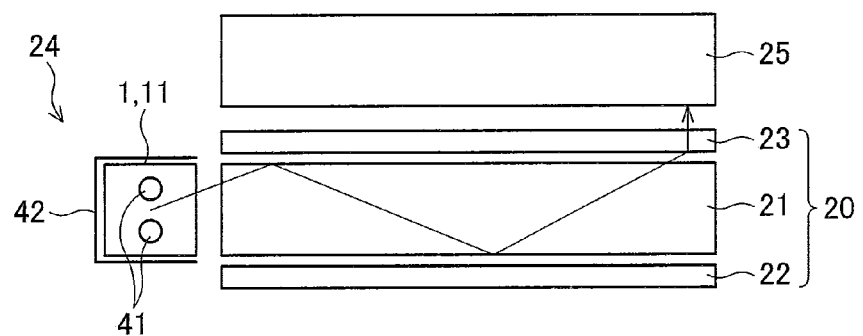
FIG. 5 is a cross-sectional view illustrating a structure of a backlight unit.
Figure 6:
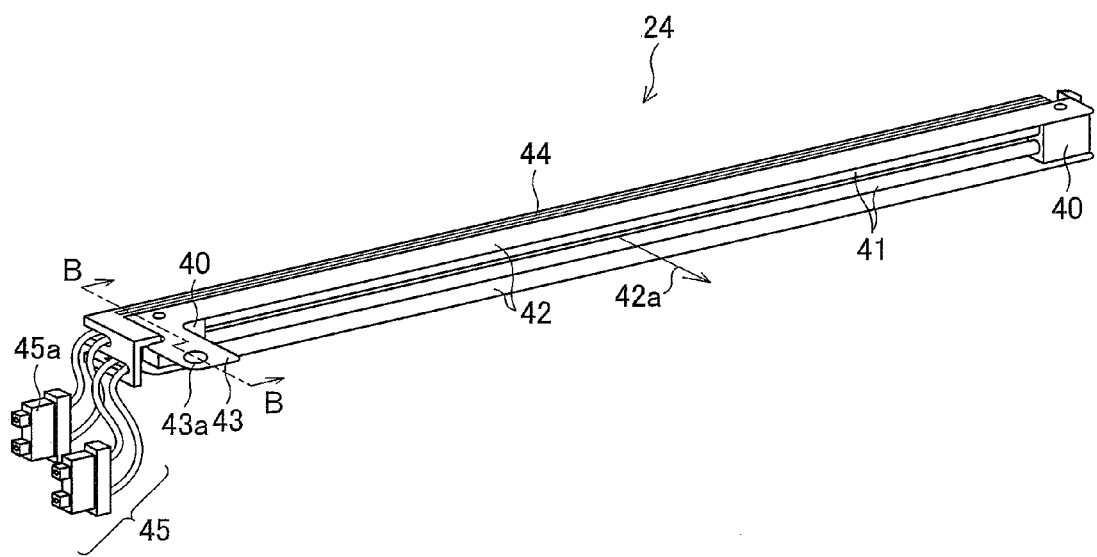
FIG. 6 is a perspective view illustrating an overall structure of a conventional lamp unit.

Furthermore, if an illumination device is configured such that the backlight unit 20 in FIG. 5 includes the lamp unit 1 as a light source unit and uses the lamp unit 1 to output illumination light, the reflective layer 422 of the conductive section 2, which is a folded section, does not peel off even over long-term use of the lamp unit 1 with the cold cathode fluorescent lamps 41 periodically replaced.

Also, if a display apparatus is configured such that the backlight unit 20 is combined with a liquid crystal panel 25 as in FIG. 5 and illumination light emitted from the backlight unit 20 is used for a display, the reflective layer 422 of the conductive section 2, which is a folded section, does not peel off even over long-term use of the lamp unit 1 with the cold cathode fluorescent lamps 41 periodically replaced.

The invention is not limited to the description of the embodiments above, but may be altered within the scope of the claims. An embodiment based on a proper combination of technical means disclosed in different embodiments is encompassed in the technical scope of the invention.

As described above, the lamp unit of the present invention, the lamp unit including (i) a lamp for emitting light and (ii) a reflective member, provided around the lamp, which has a stack of a sheet metal and a reflective layer that reflects at least a part of the light outward, includes: a folded section formed by folding back the reflective member 180 degrees such that the reflective layer is positioned inside the sheet metal, the folded section being provided with a screw hole through which the reflective member is connected to another object other than the lamp unit in the folded section.

This makes it possible to achieve a lamp unit in which, even if a reflective member is fixed to another object with a screw for conduction with an external conductor, a reflective layer is less likely to peel off.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is suitably used in a transmissive liquid crystal display apparatus.

The invention claimed is:

1. A lamp unit
including (i) a lamp for emitting light
and (ii) a reflective member, provided around the lamp, which has a stack of a sheet metal and a reflective layer that reflects at least a part of the light outward, the lamp unit comprising:
a folded section formed by folding back the reflective member 180 degrees such that the reflective layer is positioned inside the sheet metal,
the folded section being provided with a screw hole through which the reflective member is connected to another object other than the lamp unit in the folded section
in a state where the folded section is connected to said another object with a screw through the screw hole, the reflective layer in the folded section being in no contact with said another object, and the sheet metal in the folded section being in contact with said another object.

2. The lamp unit according to claim 1, wherein the another object is a part of a display apparatus.

3. The lamp unit according to claim 2, wherein the folded section is fixed with a screw through the screw hole so as to be sandwiched between the part of the display apparatus and another part of the display apparatus.

4. The lamp unit according to claim 3, wherein the another part of the display apparatus is connected to a ground conductor of the display apparatus.

5. The lamp unit according to claim 1, wherein the reflective layer is made of a conductor.

6. The lamp unit according to claim 1, wherein the reflective layer is formed with use of silver or with use of white PET.

7. The lamp unit according to claim 1, wherein the sheet metal is formed with use of stainless steel, aluminum, or brass.

8. An illumination device comprising a lamp unit as set forth in claim 1 as a light source unit, the lamp unit being used to output illumination light.

9. A display apparatus comprising an illumination device as set forth in claim 8, the illumination device emitting illumination light to be used for a display.

10. A lamp unit
including (i) a lamp for emitting light
and (ii) a reflective member, provided around the lamp, which has a stack of a sheet metal and a reflective layer that reflects at least a part of the light outward, the lamp unit comprising:
a folded section formed by folding back the reflective member 180 degrees such that the reflective layer is positioned inside the sheet metal,
the folded section being provided with a screw hole through which the reflective member is connected to another object other than the lamp unit in the folded section, wherein the another object is a part of a display apparatus.

11. The lamp unit according to claim 10, wherein the folded section is fixed with a screw through the screw hole so as to be sandwiched between the part of the display apparatus and another part of the display apparatus.

12. The lamp unit according to claim 11, wherein the another part of the display apparatus is connected to a ground conductor of the display apparatus.

* * * * *